Figure 1:
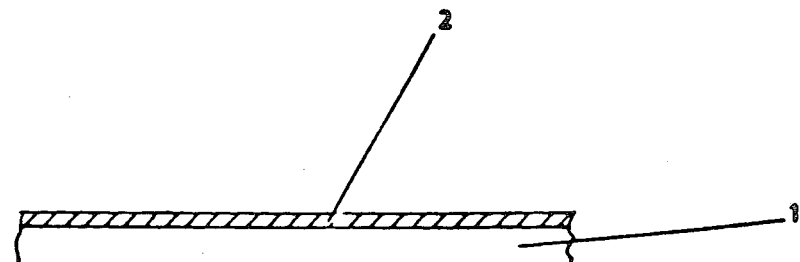

United States Patent [19]

Mitchell et al.

[11] 4,384,024
[45] May 17, 1983

[54] COMPOSITE HEAT-SEALABLE FILMS

[75] Inventors: Douglas L. Mitchell, Letchworth; Robert C. Lansbury, St. Albans, both of England

[73] Assignee: Imperial Chemical Industries Limited, London, England

[21] Appl. No.: 265,220

[22] Filed: May 19, 1981

[30] Foreign Application Priority Data

Mar. 19, 1981 [GB] United Kingdom ................ 8108702

[51] Int. Cl.³ ...................... B32B 27/08; B29C 19/00
[52] U.S. Cl. .................................. 428/349; 428/516; 428/910; 264/171
[58] Field of Search ...................... 428/516, 910, 349

[56] References Cited

U.S. PATENT DOCUMENTS 4,294,882 10/1981 Andrews et al. ................... 428/516

FOREIGN PATENT DOCUMENTS 2606 6/1979 European Pat. Off. ............ 428/516
49-14343 of 1974 Japan .
54-60348 5/1979 Japan .................................. 428/516
55-014223 1/1980 Japan .................................. 428/516
1440317 6/1976 United Kingdom .
1532180 11/1978 United Kingdom ................ 428/516

Primary Examiner—P. Ives
Attorney, Agent, or Firm—Cushman, Darby & Cushman

[57] ABSTRACT

A multiple-layer heat-sealable film comprising a polyolefin substrate layer having on at least one surface thereof a heat-sealable layer comprising a random copolymer of propylene with from greater than 4 to 10 wt% of ethylene, the copolymer having a degree of randomness of greater than 2.5.

8 Claims, 2 Drawing Figures

COMPOSITE HEAT-SEALABLE FILMS

This invention relates to a thermoplastic film, and in particular to a multiple-layer thermoplastic polymeric film.

For many applications, films are required which exhibit a combination of properties unattainable in a single film. For example, a film suitable for use in packaging foodstuffs or the like may be required to exhibit a combination of heat-sealability, tensile strength, transparency and vapour permeability which cannot be achieved in a homogeneous film.

One way in which a desired combination of properties may be attained is to form a composite structure—for example, by bonding together two or more layers of preformed film or by coating at least one surface of a (preformed) film with a layer of polymeric material applied as a (coextruded) melt, or, as a solution or dispersion in a suitably volatile medium.

The packaging industry requires large quantities of heat-sealable film, which can be exposed to temperatures at which the film can be sealed to itself without impairment of the film integrity. This is conveniently achieved by providing, on a relatively poorly sealable film substrate, a layer of heat-sealable material which can be melted at a temperature below that at which the film substrate begins to soften. To be effective, this layer of heat-sealable material must be sealable over a relatively wide temperature range, must adhere securely to the substrate, and must be sealable to itself to provide a strong bond—usually referred to as the heat-seal strength.

Modern packaging techniques frequently involve the formation of a package, by creating a heat seal between two opposed layers of a packaging film, and the substantially simultaneous introduction into the newly-formed package of the desired product. Thus, in the so-called vertical "form and fill" packaging technique a series of discrete packages is produced by forming a tubular film, collapsing the tubular film and forming a succession of horizontal heat seals, usually crimp seals, across the width of the film, the desired quantity of product being introduced into each package in the interval between the formation of successive horizontal heat seals. At high operating speeds the product is introduced into the package substantially simultaneously with the creation of the lower horizontal heat seal, and to avoid rupture of the package it is therefore essential that the inherent strength of the lower heat seal should, before dissipation of all the thermal energy applied to create the heat seal, rapidly reach a level sufficient to support and retain the product introduced into the package. Thus, the packaging film should desirably exhibit a high "hot seal strength".

Known composite packaging films, having at least one heat-sealable surface layer comprising polyethylene or an olefinic copolymer consisting predominantly of ethylene, tend to exhibit poor scratch resistance which adversely affects the transparency and appearance of the film, thereby rendering the product commercially unacceptable. In addition, such films are generally unsuitable for packaging operations because of a tendency to blocking whereby adjacent layers of the film adhere to each other. In an attempt to overcome these defects it has been proposed in Japanese patent publication No. 49(1974)14343 to employ a biaxially oriented packaging film having a substrate layer of a crystallisable polypropylene and a surface layer of a propylene-ethylene copolymer containing from 1.5 to 4.0 weight percent of ethylene and having a randomness index not exceeding 0.6 (a low randomness index defining a copolymer having a high degree of randomness). The Examples of this Japanese patent publication illustrate a minimum randomness index of 0.43 and demonstrate that as the ethylene content of the heat-sealable copolymer is increased above 4 weight percent the scratch resistance and blocking tendencies of the film deteriorate to unacceptable levels.

We have now developed an improved multiple-layer film.

Accordingly, the present invention provides a multiple-layer film comprising a polyolefin substrate layer having on at least one surface thereof a propylene-ethylene copolymer heat-sealable layer characterised in that the substrate layer comprises a polymer or copolymer of an alpha-olefin, the molecule of which contains from 2 to 6 carbon atoms, and in that the heat-sealable surface layer(s) comprises a random copolymer of propylene with from greater than 4 to 10% by weight of the copolymer of ethylene, the heat-sealable propylene-ethylene copolymer having a degree of randomness, as hereinafter defined, of greater than 2.5.

Suitable substrate materials are polymers and copolymers of alpha-olefins—such as ethylene, propylene, butene-1, 4-methylpentene-1, and hexene-1, a preferred substrate for packaging applications being a substantially crystalline propylene homo- or block co-polymer, the latter containing, for example, up to 15% by weight of the copolymer of another copolymerisable alpha-olefin, such as ethylene.

The ethylene content of the heat-sealable propylene-ethylene copolymer surface layer determined by peak height measurement of the infra-red spectrum of the copolymer, is within a range of from greater than 4 up to 10, suitably from 4.05 to 10, weight percent of the copolymer. In general, an increase in ethylene content is accompanied by an improvement in film optical characteristics, and the ethylene content is desirably maintained within a range of from 4.25 to 8, preferably from 4.5 to 6, percent by weight of the copolymer.

The degree of randomness of the propylene-ethylene copolymer from which the heat-sealable surface layer is formed is determined by an infra-red spectroscopic technique. A sample of the copolymer in powder or granular form is compression moulded at a temperature of 200° C. to form a plate of 0.5 mm thickness. The infra-red absorption spectrum of the plate is recorded, the absorption at a wave number of 732 cm$^{-1}$ being regarded as representative of the random ethylene fraction and that at 720 cm$^{-1}$ being representative of the ethylene block fraction. The degree of randomness of the copolymer is therefore defined by the ratio absorption at 732 cm$^{-1}$: absorption at 720 cm$^{-1}$. A higher ratio therefore defines a copolymer having a greater degree of randomness.

Propylene-ethylene copolymers suitable for use in forming a heat-sealable surface layer on a composite film according to the invention exhibit a degree of randomness greater than 2.5, suitable from 2.51 to 10.0. The degree of randomness of the copolymer is preferably from 4.0 to 6.5, and particularly preferably from 5.0 to 6.0.

The production of films having acceptable optical characteristics, e.g. haze, is assisted by selecting a propylene-ethylene copolymer having a melt flow index, measured in accordance with ASTM/D1238-65T, condition N (i.e. 190° C.; 10 kg), on a sample of the copolymer in powder form, of less than 75 g/10 minutes, preferably of from 60 to 0.5 g/10 minutes and particularly preferably of from 5.0 to 1.0 g/10 minutes.

Desirably, the propylene- ethylene copolymer exhibits a principal melting temperature peak of less than 150° C. and, preferably from 145° to 125° C. The principal melting temperature peak is defined as the peak of the melting endotherm observed in respect of a copolymer sample in the reheating stage of a thermal cycle in which the sample has been heated from room temperature to 230° C., held at that temperature for 5 minutes, cooled to room temperature, and reheated, each of the heating, cooling and reheating stages in the cycle being effected at a rate of 20° C. per minute.

Formation of a propylene- ethylene copolymer suitable for use in the multiple-layer films of the invention is conveniently effected in the presence of an "organometallic" catalyst, such as a transition metal compound with an organometallic activator. Particularly useful compounds of this type are titanium halide compounds activated with aluminium alkyl compounds. A preferred material is a titanium chloride material. The titanium chloride material may be essentially pure solid titanium trichloride or may be a titanium trichloride-containing material such as a product obtained by reducing titanium tetrachloride with a reducing agent such as aluminium metal, an organic aluminium compound or an organic magnesium compound. Alternatively, the titanium chloride material may be the product of contacting titanium tetrachloride with a support such as silica, alumina, magnesia, a mixture or complex of two or more thereof, or magnesium chloride. In addition to, or as an alternative to, the foregoing components, the transition metal compound may also include a Lewis Base compound such as an ether, an ester, an organic phosphorus compound or a sulphur-containing organic compound.

The copolymerisation may be effected in known manner, for example in the presence or absence of an inert diluent such as a suitably purified paraffinic hydrocarbon, in the liquid phase using an excess of the liquid monomer as the polymerisation medium or in gas phase, this latter term being used herein to mean the essential absence of a liquid medium.

If copolymerisation is effected in gas phase, it may be effected by introducing at least one of the monomers, for example propylene, into the polymerisation vessel as a liquid and operating with conditions of temperature and pressure within the polymerisation vessel such that the liquid monomer vaporises, thereby giving an evaporative cooling effect, and essentially all of the polymerisation occurs with gaseous monomers. Copolymerisation in gas phase may be effected using any technique suitable for effecting a gas-solid reaction such as a fluidised-bed reactor system, a stirred-bed reactor system or a ribbon blender type of reactor.

In general, a gas phase copolymerisation technique is preferred, the resultant propylene-ethylene copolymer exhibiting the required degree of randomness and yielding packaging films having desirable optical characteristics.

Application of the heat-sealable propylene-ethylene copolymer layer on to the substrate is conveniently effected by any of the laminating or coating techniques conventionally employed in the production of composite films. Preferably, however, the propylene-ethylene copolymer layer is applied to the substrate by means of a melt- or extrusion-coating technique in which either a molten layer of the copolymer is extruded directly onto the surface of a preformed substrate, or the polymeric components of the substrate and coating layer are coextruded into intimate contact while each is still molten. Preferably, the coextrusion is effected from a multichannel annular die so designed that the molten polymeric components constituting individual layers of the composite film merge at their boundaries within the die to form a single composite structure which is then extruded from a common die orifice in the form of a tubular extrudate.

Preferably, the composite films of this invention are stretched to orient the substrate layer thereof, orientation being effected at a temperature (eg 145°–165° C. for a propylene homopolymer substrate) at which insignificant orientation of the lower melting copolymer surface layer is achieved. Orientation may be effected uniaxially, by stretching the film in one direction, or biaxially, by stretching the film in each of two mutually perpendicular directions in the plane of the film, and the biaxial orientation may be balanced or unbalanced, for example with the higher degree of orientation of an unbalanced film in a preferred direction—usually the transverse direction. Conveniently, the polyolefin substrate material and the heat-sealable propylene-ethylene copolymer layer are coextruded in the form of a composite tube which is subsequently quenched, reheated, and then expanded by internal gas pressure to induce transverse orientation, and withdrawn at a rate greater than that at which it is extruded to stretch and orient it in the longitudinal direction. Alternatively, a flat, copolymer-coated film may be oriented by simultaneous or sequential stretching in each of two mutually perpendicular directions by means of a stenter, or by a combination of draw rolls and a stenter.

The degree to which the film is stretched depends to some extent on the ultimate use for which the film is intended, but for a polypropylene-based packaging film we find that satisfactory tensile and other properties are developed when the film is stretched to between three and ten, preferably, seven, times its original dimensions in each of the transverse and longitudinal directions.

After stretching, the polymeric film is normally "heat-set", while restrained against shrinkage or even maintained at constant dimensions, at a temperature above the glass transition temperature of the polymer and below its melting point. The optimum heat-setting temperature can readily be established by simple experimentation, and for a polypropylene substrate, "heat-setting" is conveniently effected at temperatures in the range of from 100° C. to 170° C. Heat-setting may be effected by conventional techniques—for example by means of a stenter system, or by a system of one or more heated rollers as disclosed, for example, in British Pat. No. 1 124 886.

Composite films in accordance with the present invention may be prepared in a range of thicknesses governed primarily by the ultimate application for which a particular film is to be employed. Films, having a total thickness in a range extending from 2.5 to 100 microns are of general utility, but for packaging applications we prefer to employ film of from about 10 to 50 microns in total thickness.

The ratio of substrate to propylene-ethylene copolymer layer thickness may vary within a wide range, although we prefer that the thickness of the copolymer layer(s) should not be less than 0.2% (preferably 0.5%), nor greater than 50% of that of the substrate. To ensure an acceptably high value of hot seal strength, we prefer that the thickness of each propylene-ethylene copolymer layer should be at least 0.05 micron and preferably should not greatly exceed about 2.0 microns, a particularly suitable range of thickness being from 0.3 to 0.9 micron.

If desired, both of the substrate surfaces may be provided with a propylene-ethylene copolymer heat-sealable layer, and the thicknesses of the two heat-sealable layers may be the same or different. For example, a substrate film of 25 microns thickness is conveniently provided with a propylene-ethylene copolymer layer of 0.9 micron thickness on one surface and with a propylene-ethylene copolymer layer of 0.6 micron thickness on the other surface. Alternatively, one surface of the substrate may be uncoated, or may be coated with a layer of a different composition depending on the properties required of the film for a particular application.

If desired, for example to improve print receptivity, a surface of a multiple-layer film according to the present invention may be subjected to a chemical or physical surface-modifying treatment, a preferred treatment, because of its simplicity and effectiveness, being to subject the film surface to a high voltage electrical stress accompanied by corona discharge.

If desired, the seal strength of multiple-layer films according to the present invention may be improved by incorporating into the substrate layer a portion of scrap polymeric material, both substrate and heat-sealable layer(s), reclaimed from a previously produced multiple-layer film. Conveniently, the reclaimed material constitutes from 25 to 50%, preferably from 30 to 45%, by weight of the substrate layer, but reclaim levels within an extensive range on either side of these values can be tolerated.

One or more of the layers of the composite films of the present invention may conveniently contain any of the additives conventionally employed in the manufacture of thermoplastic films. Thus, additives such as dyes, pigments, lubricants, anti-static agents, anti-oxidants, anti-blocking agents, surface-active agents, stiffening aids, slip aids, gloss-improvers, prodegradants, and ultra-violet light stabilisers may be employed. If desired, such of the aforementioned additives as may be required—particularly an anti-static system, may be applied directly to a surface of the film, preferably prior to orientation—for example by a wash-coating technique.

Composite films prepared in accordance with the present invention are heat-sealable at comparatively low temperatures, for example at temperatures of the order of 120° C. and lower, to provide a strong, hermetic seal. In addition, the films exhibit good scuff resistance and desirable optical characteristics.

The hot seal strength rating of a film according to the present invention is determined by means of a calibrated strip of spring steel of approximately 25 mm width and 400 mm length. Calibration of the spring steel strip is effected by folding the strip over upon itself about its mid-point, somewhat in the form of a "C" with elongated limbs, and gradually applying an increasing load in the form of weights positioned on the uppermost limb adjacent the free end thereof until the free ends of the spring just make contact with each other. If, for example, the required loading of the selected spring is 100 grammes, the spring is rated as a "100 gramme spring".

A strip of a multiple-layer film having a width of 25 mm and a length of about 150 mm, is folded over upon itself for testing so that portions of the heat-sealable surface layer are in contact with each other, and the free ends of the film strip are secured by a suitable adhesive to the outermost surface of the free ends of the previously calibrated spring strip. The latter is maintained under manual compression so that the free ends of the spring strip remain in contact until the opposed surfaces of the film strip are sealed together between the heated jaws of a Sentinel Heat Sealer (Model No. 12AS), the free ends of the spring strip being positioned outside but immediately adjacent the edges of the sealing jaws. The depth "y" of the jaws, aligned parallel to the longitudinal axis of the film strip, is 25 mm, so that a square heat-seal of side 25 mm is formed between the opposed surfaces of the film strip.

Upon closure of the sealing jaws the manual compression force is removed from the steel strip so that immediately upon retraction of the sealing jaws to the open position after formation of the heat seal, the free ends of the steel strip are allowed to spring apart thereby tending to rupture the newly created heat seal. The depth "x" of the opening thereby induced in the seal, parallel to the length of the film strip, provides a measure of the strength of the seal, the degree of seal opening being expressed in the form x 100/y%. The test procedure is then repeated on other samples of film.

In contrast to the hot seal strength which is determined before the thermal energy employed to form the heat-seal has dissipated, the "cold" heat-seal strength of the film is determined after the seal has cooled to ambient temperature, and the full potential strength of the seal has developed.

To determine the "cold" heat-seal strength, two strips of a multiple-layer film having at least one heat-sealable surface layer were placed with the heat-sealable surfaces in contact with each other, and the ends of the strips sealed together between the jaws of a Sentinel Heat Sealer, Model No. 12AS, only one jaw of the unit being heated. The strength of the seal was measured by cutting from the sealed-together strips of film, which had been allowed to cool to ambient temperature, a strip 25 mm wide and some 100 mm long, the heat seal extending across the entire width of the strip and having an area of some 25×25 mm. The unsealed ends of the strip were then attached respectively to a dynamometer and a gripping surface, a load was applied to the gripping surface, and the load required to separate the strips in the sealed area, at a rate of 30.5 cms per minute, was recorded by the dynamometer, and expressed as a seal strength of x g/25 mm, where x was the load in grammes.

Figure 2:
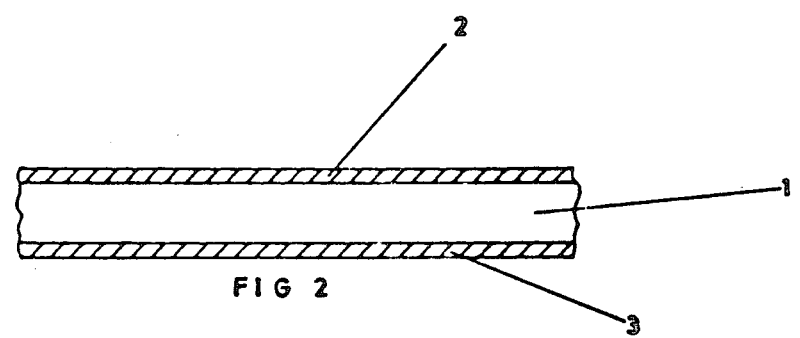

The invention is illustrated by reference to the accompanying drawings in which:

FIG. 1 depicts a side elevation of a portion of a propylene homopolymer base film 1 having a thin layer 2 of a propylene-ethylene random copolymer on one surface thereof, and FIG. 2 depicts a side elevation of a similar substrate film 1 having a thin layer 2, 3 of the propylene-ethylene random copolymer on each surface thereof.

The invention is further illustrated by reference to the following Examples:

EXAMPLES 1 TO 8

Using a catalyst prepared by reacting Stauffer TlCl$_3$-AA with tri-n-butyl phosphine in a molar ratio of 4.2:1 in accordance with Example 2 of British Pat. No. 1 485 181, various propylene-ethylene copolymers were prepared by reacting propylene and ethylene in appropriate ratios under gas phase polymerisation conditions at a temperature of 70° C. and a reactor pressure of 26.5 kgcm$^{-2}$ gauge. Hydrogen was introduced into the reactor, as necessary, to control the melt flow index of the copolymer product at the desired level. Dechlorination of the resultant copolymers was effected in a fluidised bed reactor at a temperature of about 100° C.

From a triple channel annular die were coextruded a propylene homopolymer and a propylene-ethylene random copolymer containing about 6.3% by weight of ethylene (by infra-red peak height measurement), and prepared by the hereinbefore described gas phase technique, so as to form a polypropylene tube the internal and external surfaces of which were coated with a layer of the ethylene copolymer.

The propylene-ethylene copolymer had a degree of randomness, as hereinbefore defined, of 2.8, a powder melt flow index (ASTM/D1238-65T—condition N) of 42, and a principal melting temperature peak, measured as hereinbefore described, of 136° C.

The coated polypropylene tube was cooled by passage over a mandrel within the tube, and externally quenched by passage through a water bath surrounding the mandrel, heated to stretching temperature, expanded by internal gas pressure, and withdrawn from the expansion zone at a rate greater than that at which it was fed thereto, so that the tube was stretched to seven times its original dimensions in both the direction of extrusion and in a direction transverse thereto.

The stretched tubular film was then opened out to form flat film which was subsequently heat-set at a temperature of about 130° C. on a matt-surfaced roller heat-setter of the kind described in British Pat. No. 1 124 886.

Discharge treatment of the heat-set film was effected by a single aluminium rod electrode extending across the entire width of the film, and connected to a Sherman GT60, 6 kilowatts, solid state corona treater, operating at 3 amps.

The thickness of the propylene-ethylene random copolymer layer on each surface of the resultant film was 0.6 micron, the substrate having a thickness of about 25 microns.

Samples of the film were heat-sealed on a Sentinel Heat Sealer, Model No. 12AS, operating at a jaw pressure of 15 psi (0.1 MNm$^{-2}$) and jaw closure time of 2 seconds, at different jaw temperatures, only one jaw of the sealer being heated.

The hot seal strength of the resultant seals was determined, as hereinbefore described, using a steel strip spring rated at 150 grammes.

The "cold" heat-seal strength (at ambient temperature) of the sealed film samples was assessed by the dynamometer technique, as hereinbefore described.

The optical characteristics of samples of the film were assessed by measurement of wide angle haze and gloss (Gardner).

The procedure was repeated with a variety of gas phase copolymers (Examples 2 to 6), and also with two propylene-ethylene copolymers produced by a conventional diluent phase process (Examples 7,8).

The results are recorded in the accompanying Table.

TABLE

| | Propylene-Ethylene Copolymer | | | | Film Characteristics | | | | |
|---|---|---|---|---|---|---|---|---|---|
| | | | | | Hot Heat Seal Strength | | Cold Heat Seal Strength | Optical | |
| | | | | | Min. Seal Temp. for <30% seal opening °C. | Seal Temp. for Optimum Strength °C. | Min. Seal Temp. for 350 g/ 25mm °C. | | |
| Ex. | Ethylene Content Wt. % | Degree of Randomness | Melt Flow Index g/10 min. | Principal Melting Peak °C. | | | | Wide Angle Haze % | Gardner Gloss % |
| 1 | 6.3 | 2.8 | 42 | 136 | 114 | 115 | | 5.5 | 82 |
| 2 | 5.1 | 5.5 | 27 | 134 | 113 | 115 | 109 | 1.7 | 83 |
| 3 | 4.4 | 5.5 | 45 | 138 | 114 | 120 | 112 | 1.9 | 79 |
| 4 | 4.3 | 5.0 | 53 | 139 | 118 | | | 1.7 | 87 |
| 5 | 4.3 | 4.8 | 38 | 140 | 118 | | | 1.5 | 87 |
| 6 | 3.9* | 5.5 | 46 | 140 | 118 | 125 | 111 | 2.3 | 77 |
| 7** | 5.2 | 3.8 | 45 | 134 | 113 | 120 | 105 | 3.3 | 66 |
| 8** | 4.4 | 4.5 | | 139 | 117 | 120 | 112 | 3.5 | 67 |

*not according to invention
**diluent phase copolymer

The tabulated data demonstrate, inter alia, that:

(a) for corresponding ethylene contents (Examples 2,3,7,8), gas phase copolymers generally exhibit a higher degree of randomness than diluent phase copolymers.

(b) the gas phase copolymers yield films having superior optical characteristics (gloss and haze) than diluent phase copolymers.

(c) for gas phase copolymers of identical degree of randomness (Examples 2,3,6), progressively increasing the ethylene content of the copolymer above 4 weight % yields films with progressively superior optical characteristics.

(d) for gas phase copolymers of identical degree of randomness (Examples 2,3,6), progressively increasing the ethylene content of the copolymer above 4 weight % results in a progressive decrease in the sealing temperatures required to yield heat-seals of acceptable strength.

We claim:

1. A multiple-layer film comprising a polyolefin substrate layer having on at least one surface thereof a propylene-ethylene copolymer heat-sealable layer wherein the substrate layer comprises a polymer or copolymer of an alpha-olefin, the molecule of which contains from 2 to 6 carbon atoms, and wherein the heat-sealable surface layer on said at least one surface comprises a random copolymer of propylene with ethylene, the ethylene content of the copolymer being within a range of from greater than 4 up to 10% by weight of the copolymer and the heat-sealable propylene-ethylene copolymer having a degree of randomness of greater than 2.5.

2. A multiple-layer film according to claim 1 wherein the substrate layer comprises a propylene homopolymer.

3. A multiple-layer film according to claim 1 wherein the copolymer forming the at least one surface layer contains from 4.25 to 8.0 weight percent of ethylene based on the weight of the copolymer.

4. A multiple-layer film according to claim 1 wherein the degree of randomness of the propylene-ethylene copolymer is from 4.0 to 6.5.

5. A multiple-layer film according to claim 1 wherein the propylene-ethylene copolymer has a melt flow index of less than 75 g/10 minutes.

6. A multiple-layer film according to claim 1 wherein the propylene-ethylene copolymer has a principal melting temperature peak of less than 150° C.

7. A multiple-layer film according to claim 1 wherein the propylene-ethylene copolymer is produced by a gas phase copolymerisation process.

8. A multiple-layer film according to claim 1 wherein at least the substrate layer is biaxially oriented.

* * * * *